US012602203B2

(12) United States Patent
Mohana

(10) Patent No.: US 12,602,203 B2
(45) Date of Patent: Apr. 14, 2026

(54) INTEGRATION FLOW DESIGN GUIDELINES VALIDATOR

(71) Applicant: SAP SE, Walldorf (DE)

(72) Inventor: Mayura Belur Mohana, Bangalore (IN)

(73) Assignee: SAP SE, Walldorf (DE)

( * ) Notice: Subject to any disclaimer, the term of this patent is extended or adjusted under 35 U.S.C. 154(b) by 205 days.

(21) Appl. No.: 18/482,288

(22) Filed: Oct. 6, 2023

(65) Prior Publication Data

US 2025/0117190 A1    Apr. 10, 2025

(51) Int. Cl.
G06F 8/10 (2018.01)
G06F 8/20 (2018.01)
G06F 8/77 (2018.01)

(52) U.S. Cl.
CPC .................. G06F 8/10 (2013.01); G06F 8/20 (2013.01); G06F 8/77 (2013.01)

(58) Field of Classification Search
None
See application file for complete search history.

(56) References Cited

U.S. PATENT DOCUMENTS 7,603,653 B2 * 10/2009 Sundararajan ......... G06Q 10/06
                                               717/109
8,239,820 B1 * 8/2012 White ................. G06F 11/3688
                                               717/126

9,606,971 B2 * 3/2017 Seolas ................. G06F 11/3608
2008/0148235 A1 * 6/2008 Foresti ............... G06F 11/3604
                                               717/125
2008/0184200 A1 * 7/2008 Burns ................. H04L 41/0894
                                               717/121

(Continued)

OTHER PUBLICATIONS

T. Robal, J. Marenkov and A. Kalja, "Ontology Design for Automatic Evaluation of Web User Interface Usability," 2017 Portland International Conference on Management of Engineering and Technology (PICMET), Portland, OR, USA, 2017, pp. 1-8. (Year: 2017).*

*Primary Examiner* — Andrew M. Lyons
(74) *Attorney, Agent, or Firm* — Buckley, Maschoff & Talwalkar LLC

(57)                ABSTRACT
A system associated with an enterprise cloud computing environment having an integration service may include an integration flow design guidelines data store that contains a plurality of electronic records, each record comprising an integration flow design guideline identifier and human-readable integration flow design guideline requirements. An integration flow design guideline validator may receive, from an integration developer, an integration flow model for the integration service defined in a standardized graphical notation protocol. The validator may then determine which integration flow design guideline requirements are applicable to the received integration flow model. The system automatically generates compliance results based on whether the received integration flow model complies with each applicable integration flow design guideline requirement using rule concept semantics. In addition, the validator may perform a non-compliance analysis, determine a non-compliance severity indication, generate at least one compliance recommendation, and/or provide an output to the integration developer.

19 Claims, 15 Drawing Sheets

(56)  References Cited

U.S. PATENT DOCUMENTS

| | | | | |
|---|---|---|---|---|
| 2008/0263505 A1 * | 10/2008 | StClair | ...................... | G06F 8/10 |
| | | | | 717/106 |
| 2008/0301553 A1 * | 12/2008 | Basu | ......................... | G06F 8/10 |
| | | | | 715/700 |
| 2010/0058291 A1 * | 3/2010 | Hahn | .................. | G06F 11/3612 |
| | | | | 717/113 |
| 2013/0019224 A1 * | 1/2013 | Madl | ......................... | G06F 8/10 |
| | | | | 717/104 |
| 2014/0068697 A1 * | 3/2014 | Brucker | ............... | G06F 21/563 |
| | | | | 726/1 |
| 2016/0292066 A1 * | 10/2016 | Stevens | ............... | G06F 11/3624 |
| 2017/0185381 A1 * | 6/2017 | Chandra | ................... | G06F 8/10 |
| 2018/0041534 A1 * | 2/2018 | Peters | ................. | H04L 63/1433 |
| 2020/0364343 A1 * | 11/2020 | Atighetchi | ............. | G06F 8/427 |
| 2021/0182703 A1 * | 6/2021 | Velammal | .............. | G06N 20/00 |
| 2021/0349808 A1 * | 11/2021 | Chen | ....................... | G06F 9/541 |

* cited by examiner

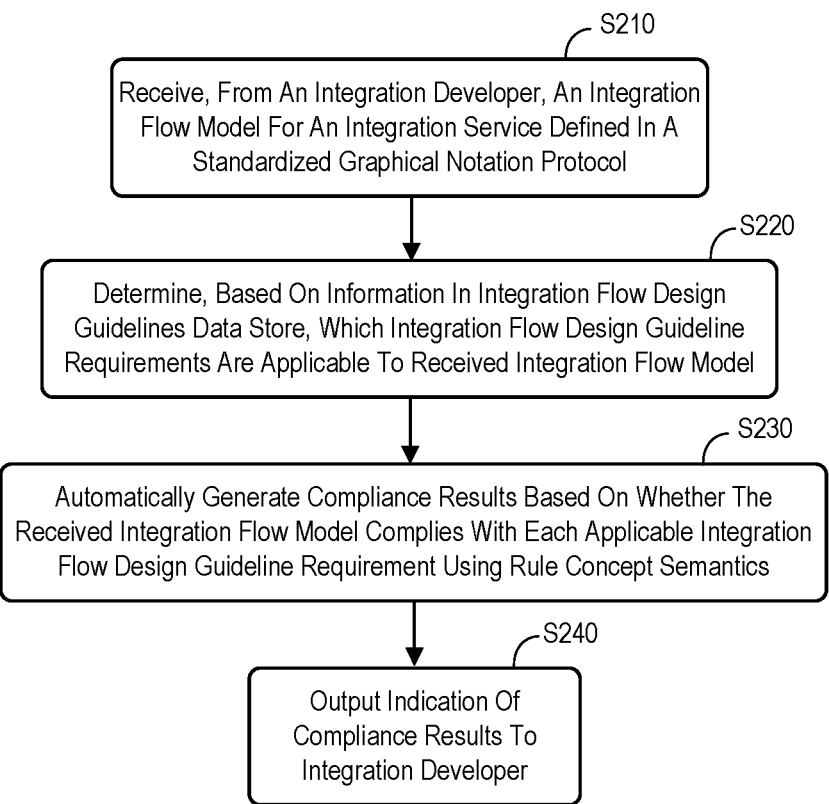

S210

Receive, From An Integration Developer, An Integration Flow Model For An Integration Service Defined In A Standardized Graphical Notation Protocol

S220

Determine, Based On Information In Integration Flow Design Guidelines Data Store, Which Integration Flow Design Guideline Requirements Are Applicable To Received Integration Flow Model

S230

Automatically Generate Compliance Results Based On Whether The Received Integration Flow Model Complies With Each Applicable Integration Flow Design Guideline Requirement Using Rule Concept Semantics

S240

Output Indication Of Compliance Results To Integration Developer

*FIG. 2*

ANTLR Grammar

400 grammar IFDG;

parse
: expression EOF expression
: LPAREN expression RPAREN                          #parenExpression
| NOT expression                                    #notExpression
| left=expression op=comparator right=expression    #comparatorExpression
| ef=Hexpression op=binary raight=expression        #binaryExpression
| bool                                              #boolExpression
| IDENTIFIER                                         #identifierExpression
| DECIMAL                                            #decimalExpression
| KPI                                                #kpiExpression comparator
: GT | GE | LT | LE | EQ KPI
: 'Page Size' | 'Process in Pages' | 'Looping Process Call' | 'Body Size (in MB)' | 'HTTP Session Reuse'
| 'Transaction Handling' | 'Performance Tuning Required' | 'Memory Tuning Required' | 'Retry Interval (in min)'
| 'Maximum Retry Interval (in min)' | 'Exponential Backoff' | 'Dead-Letter Queue' | 'Timeout Interval (in ms)'
| 'Message validator exist for External Call' | 'Integration Logic Outsourced' | 'Configurations Externalized'
| 'Exception Subprocess Exist' | 'CSRF Protected' | 'Message Digest Supported' | 'Message Level Security'
| 'XPATH Absolute Path' | 'Streaming Supported' | 'Quality of Service Exactly Once' | 'Dynamic Filter'
| 'Stream XMLSlurper input' | 'Access Secure Parameters in Script Code' | 'Avoid writing the payload as message processing log attachment'

410

Sample Expression (Process in Pages =TRUE) AND (Page Size >=7) AND (Looping Process Call = TRUE)

| RULE IDENTIFIER 1102 | RULE DESCRIPTION 1104 | INTEGRATION FLOW 1106 | APPLICABLE? 1108 | COMPLY? 1110 |
|---|---|---|---|---|
| R_101 | Transaction Handling | IF_101 | NO | |
| R_102 | Incoming Messages | IF_101 | NO | |
| R_103 | Large Batch Sizes | IF_101 | YES | NO - RECOMMENDATION |
| R_104 | Optimize Performance | IF_101 | YES | YES |

INTEGRATION FLOW
DESIGN GUIDELINES
TOOL

Integration Flow Component
Attributes

1210

Integration Flow Process
Attributes

Integration Flow Collaboration
Attributes

1220

More Info

Occurrence Of Enterprise
Integration Patterns

INTEGRATION FLOW DESIGN GUIDELINES VALIDATOR

BACKGROUND

An enterprise may utilize a cloud computing environment to let users perform tasks. For example, the enterprise might let various users execute applications via the cloud computing environment to process purchase orders, adjust human resources information, generate invoices, etc. In some cases, the cloud computing environment will support the exchange of information between multiple applications. An integration service may let an integration developer define integration flows, including integration components and interactions between components, to implement various applications. For example, the SAP™ Cloud Integration web tool implements enterprise integration patterns using Business Process Model and Notation 2 ("BPMN2") as a semantic model for message-based integration in an integration flow (also referred to as an iFlow). BPMN2 is a standardized graphical notation that promotes communication between non-technical business users (who document processes) and developers (who implement the processes using business execution languages). The BPMN2 model may specify how a message is processed on a tenant using various enterprise integration patterns.

Note that an integration developer may need to design integration flows in a robust fashion in order to safeguard enterprise mission-critical business processes. To facilitate this, an enterprise may implement integration flow design guidelines and patterns to help the developer design common enterprise integration patterns and build enterprise-grade integration flows. The guidelines might, for example, apply readability standards to keep integration flows readable, easy to understand, and simple to maintain for support requirements. Similarly, the guidelines may apply high security standards to help make sure that data is protected (e.g., which options are applied to protect the content of messages between a sender and a receiver). Failing to follow the guidelines may result in a scenario being exposed to higher risk for attacks, third parties may access sensitive data, etc.

An enterprise may establish hundreds of such integration flow design guidelines in the areas of security, readability, error handling, scripting, managing well-defined boundary, etc. Ensuring and/or investigating compliance with such a substantial number of guidelines can be a time consuming, difficult, and error prone task. For example, when there are a large number of integration flow design guidelines it can take lot of time to read and understand the concepts (and then apply those concepts) while building new integration flows. This can significantly increase onboarding time for new integration developers. Moreover, an integration developer (or support user) might not be sure which design guideline rules are applicable to a particular integration flow that has already been implemented. A manual investigation into compliance with enterprise guidelines can often take several days to complete. Moreover, poorly designed integration flows can also cause performance and stability issues, resulting in unnecessary infrastructure upgrades (increases in memory, CPU resources, worker nodes, etc.) which are an extra, unnecessary cost for the enterprise and for customers.

It would therefore be desirable to provide an integration flow design guidelines validator for an integration service in a cloud computing environment in a secure, automatic, and efficient manner.

SUMMARY

According to some embodiments, methods and systems associated with a cloud computing environment may include an integration flow design guidelines data store that contains a plurality of electronic records, each record comprising an integration flow design guideline identifier and human-readable integration flow design guideline requirements. An integration flow design guideline validator may receive, from an integration developer, an integration flow model for the integration service defined in a standardized graphical notation protocol. The validator may then determine which integration flow design guideline requirements are applicable to the received integration flow model. The system automatically generates compliance results based on whether the received integration flow model complies with each applicable integration flow design guideline requirement using rule concept semantics. In addition, the validator may perform a non-compliance analysis, determine a non-compliance severity indication, generate at least one compliance recommendation, and/or provide an output to the integration developer.

Some embodiments comprise: means for receiving, by a computer processor of an integration flow design guideline validator from an integration developer, an integration flow model for the integration service defined in a standardized graphical notation protocol; means for determining, based on information in an integration flow design guidelines data store that contains a plurality of electronic records, each record comprising an integration flow design guideline identifier and human-readable integration flow design guideline requirements, which integration flow design guideline requirements are applicable to the received integration flow model; means for automatically generating compliance results based on whether the received integration flow model complies with each applicable integration flow design guideline requirement using rule concept semantics; and means for outputting an indication of the compliance results to the integration developer.

Some technical advantages of some embodiments disclosed herein are improved systems and methods to provide an integration flow design guidelines validator for an integration service in a cloud computing environment in a secure, automatic, and efficient manner.

BRIEF DESCRIPTION OF THE DRAWINGS

FIG. 2 is a method according to some embodiments.

FIG. 4 illustrates ANTLR grammar according to some embodiments.

FIG. 11 is portion of an IFDG validation data store in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
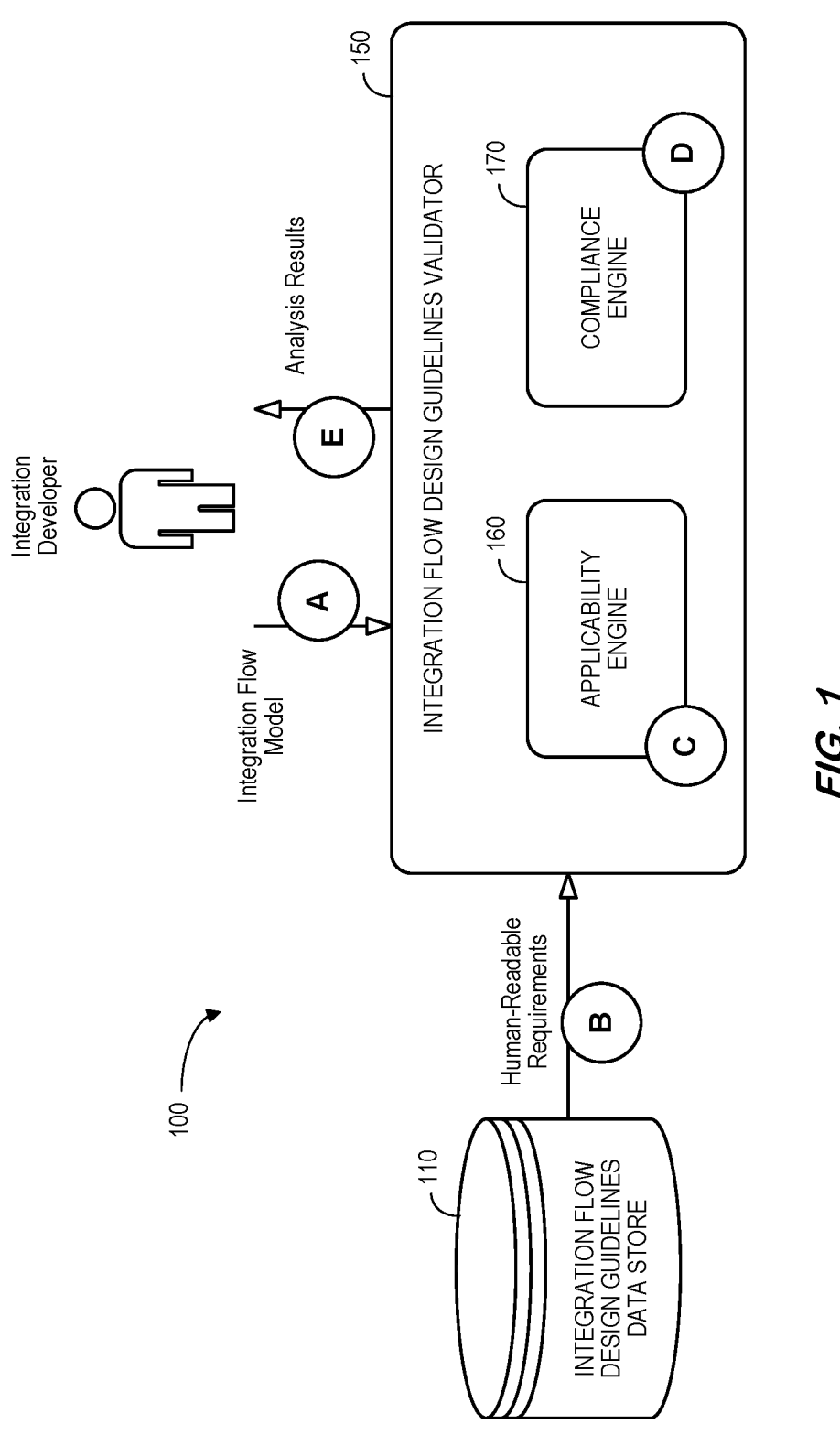
FIG. 1 is high-level system architecture in accordance with some embodiments.

FIG. 1 is a high-level block diagram of one example of a system 100 that provides an integration service. In particular, an integration developer may provide an integration flow model to an integration flows design guidelines validator 150 at (A). The integration flow model may be a new flow that is being developed, an existing flow that is experiencing problems, etc. At (B), the integration flows design guidelines validator 150 accesses human-readable requirements from an integration flow design guidelines data store 110. The integration flows design guidelines validator 150 may then use an applicability engine 160 at (C) to determine which requirements are even applicable to the received integration flow model. At (D), integration flows design guidelines validator 150 may use a compliance engine 170 to determine, for each applicable requirement, whether or not the model satisfied the requirement. The result of the analysis may then be provided at (D) to the integration developer. According to some embodiments, a remote operator or administrator device may be used to configure or otherwise adjust the system 100.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The integration flows design guidelines validator 150 may store information into and/or retrieve information from various data stores (e.g., a requirement, a tenant configuration, or analysis results), which may be locally stored or reside remote from the integration flows design guidelines validator 150. Although a single integration flows design guidelines validator 150 is shown in FIG. 1, any number of such devices may be included. Moreover, various devices described herein might be combined according to embodiments of the present invention. For example, in some embodiments, the integration flow design guidelines data store and the integration flows design guidelines validator 150 might comprise a single apparatus. The system 100 functions may be performed by a constellation of networked apparatuses, such as in a distributed processing or cloud-based architecture.

The integration developer may access the system 100 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via a remote device (e.g., to specify how requirements might be interpreted) and/or provide or receive automatically generated recommendations, alerts, or results associated with the system 100.

FIG. 2 is a method that might performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an integration flow design guideline validator may receive, from an integration developer, an integration flow model for an integration service defined in a standardized graphical notation protocol. The received integration flow model might be, for example, associated with enterprise integration patterns. In some embodiments, the integration flow design guideline validator is implemented as a Software-as-a-Service ("SaaS"). Moreover, in some embodiments, the integration flow design guideline validator utilizes a computer-based language recognition parser generator such as Another Tool for Language Recognition ("ANTLR").

At S220, the system may determine, based on information in an integration flow design guidelines data store, which integration flow design guideline requirements are applicable to the received integration flow model. The integration flow design guidelines data store may contain, for example, a plurality of electronic records, each record having an integration flow design guideline identifier and human-readable integration flow design guideline requirements. The human-readable integration flow design guideline requirement might be associated with, for example, security, readability, error handling, scripting, managing boundary conditions, memory optimization, performance optimization, etc. In some embodiments, the determination of which integration flow design guideline requirements are applicable to the received integration flow model is automatically performed using rule concept semantics.

At S230, the system may automatically generate compliance results based on whether the received integration flow model complies with each applicable integration flow design guideline requirement using rule concept semantics. At S240, the integration flow design guideline validator may output an indication of the compliance results to the integration developer. In some embodiments, the integration flow design guideline validator is further to, for each applicable integration flow design guideline requirement that is not complied with by the received integration flow model, automatically provide a non-compliance analysis to the integration developer. The non-compliance analysis may include a non-compliance severity indication and/or at least one compliance recommendation. In some embodiments, the non-compliance analysis includes an analysis of integration flow component attributes, integration flow process attributes, integration flow collaboration attributes, enterprise integration pattern occurrence, component metadata and component versioning, scripting code libraries and functions, semantic deviations from the standardized graphical notation protocol, open source framework guidelines, etc.

Some embodiments, building a SaaS service in the SAP™ Business Technology Platform ("BTP") to analyze integration flows for adherence to integration flow design guidelines using a simple and intuitive approach and ANTLR expression validation techniques. The analysis may be performed in substantially less time as compared to traditional approaches (e.g., a few seconds instead of several days) and provides detailed rule compliance analysis and implementation guidance.

Figure 3:
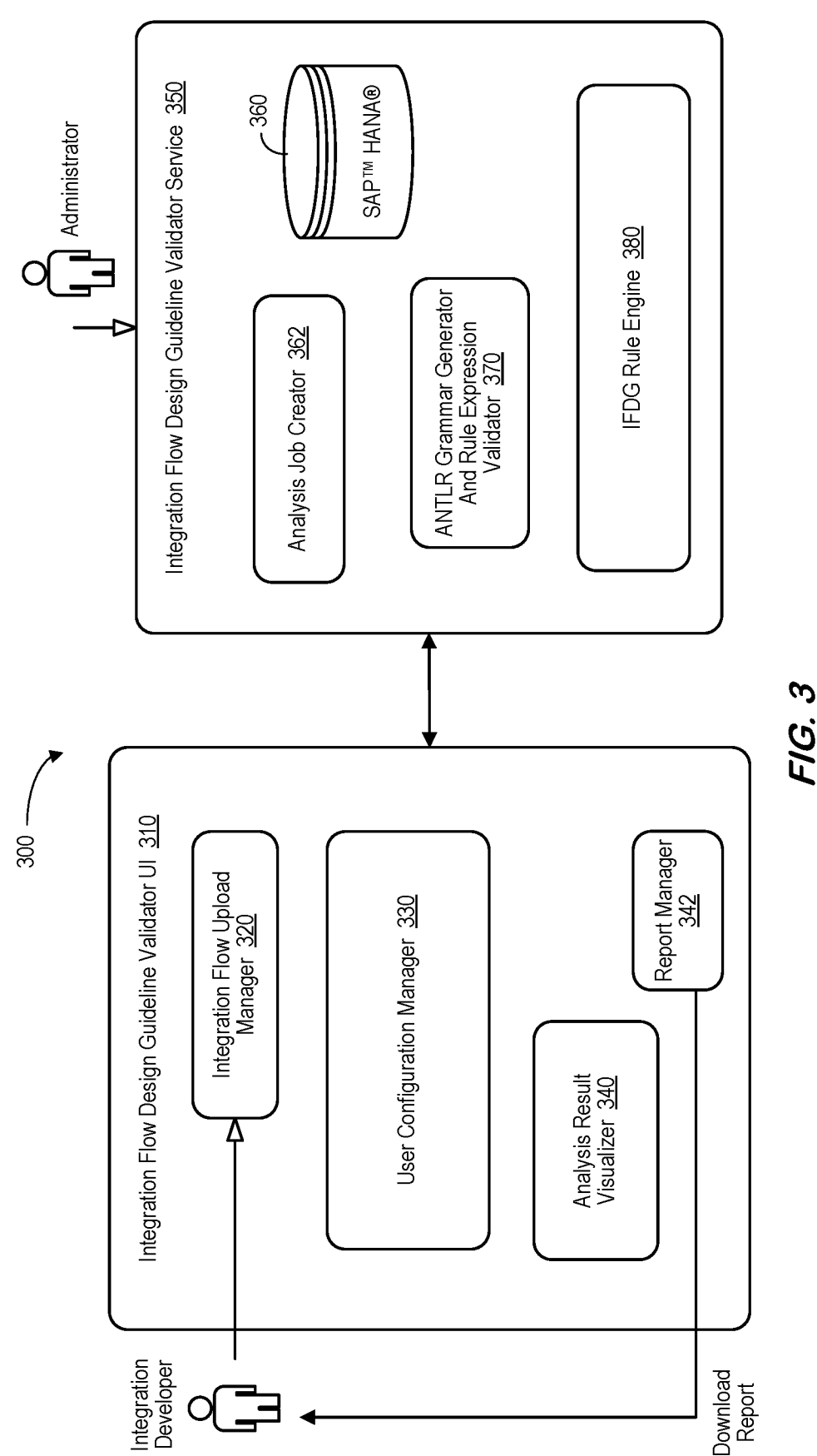
FIG. 3 is a business technology platform in accordance with some embodiments.

FIG. 3 is a business technology platform 300 in accordance with some embodiments. The platform 300 may implement an Integration Flow Design Guidelines ("IFDG") validator service using two main components: an IFDG validator User Interface ("UI") 310 (e.g., an SAPUIS application) and an IFDG validator service 350. The IFDG validator UI 310 provides an interface to upload an integration artifact, customize a user configuration in context of rules, naming conventions and provide comprehensive rules design guidelines analysis and recommendations to improve integration flows. The IFDG validator UI 310 receives an integration flow model from an integration developer via an integration flow upload manager 320. The integration flow upload manager 320 may be responsible for handling integration flow resource artifact upload based on certain checks (such as artifact type and artifact manifest file). In some embodiments, once a valid integration flow artifact is uploaded, it is sent to the IFDG validator service 350. The IFDG validator service 350 returns a valid HTTP response with a job identifier when the process is successful. The job identifier might be, for example, used for further requests to perform integration flow design guidelines analysis, downloading analysis reports, etc.

The IFDG validator UI 310 also includes a user configuration manager 330. The user configuration manager 330 provides a way to customize the user configuration data for the design guideline rules compliancy analysis provided by the IFDG validator service 350 and lets a user maintain a custom configuration whenever the platform is used. In some embodiments, the IFDG validator UI 310 also includes an analysis result visualizer 340. The analysis result visualizer 340 might, for example, show integration flow design guideline validation results in a table. The IFDG validator UI 310 also includes a report manager 342 that generates an analysis report in either a PDF or Excel® format which can be shared with the different stakeholders for further action. The analysis report might consider only the rules which are (1) applicable to the integration flow and (2) not compliant with the design guidelines. The report may indicate the severity of any detected deviations and/or provide suggestions to help a user make changes to the integration flow implementation to ensure compliance. In some embodiments, the user can click on a design guideline rule documentation link and to easily access more details about the guideline.

The IFDG validator service 350 may utilize an in-memory, column-oriented, relational database management system such as SAP™ HANA® 360. The IFDG validator service 350 may analyze an integration flow for design guideline rule implementation compliance and provide recommendations about how to improve it. The analysis may involve analyzing integration flow resource artifacts such as BPMN2 model, scripts, Java Archive ("JAR") files, schema definition files, property files, etc. Some embodiments may use a dedicated JAVA implementation class for each integration flow design guideline rule. This may implement a generic rule interface to compute: rule applicability, a rule compliancy check based on design guidelines, a rule result analysis, and rule specific expression validation using ANTLR framework. Each design guideline rule may have its own rule definition which provides data about what information to analyze in the BPMN2 model. Each design guideline rule may also be categorized into different analysis categories (and a unique execution plan may exist for each of these categories). A rule execution plan may implement functionality to parse and analyze the BPMN2 model for rule definition entities as a part of a rule compliancy check analysis. In some embodiments, the IFDG validator service 350 runs as microservice in the SAP® BTP and use the SAP™ HANA® 360 for persistence requirements.

The analysis job creator 362 may interact with the integration flow upload manager 320. In some embodiments, the analysis job creator 362 may create an analysis job and analyze the integration flow archive, extract the resource artifacts such as BPMN2 model, scripts, and store them in the SAP™ HANA® 360. The analysis job creator 362 may also store the user specific configuration related to rules and naming conventions into the SAP™ HANA® 360.

An IFDG rule engine 380 may analyze the integration flow BPMN2 model for deviations from the integration flow design guidelines and provide a detailed analysis. The analysis may indicate if a specific design guideline rule is applicable to the integration flow, whether the integration flow is compliant with the rule guidelines based on rule concept semantics from the integration design guideline rule documentation. If rule is not complaint, the analysis might indicate what integration flow steps or integration patterns are causing the issue (what was expected and what was found in the integration flow), recommend changes, etc. The IFDG rule engine 380 may provide a framework for executing integration flow design guideline rules on the BPMN2 model. This also defines a generic interface for implementing new rules and provides categorization based on rule definition and implementation for rule execution plans. In some embodiments, the IFDG rule engine framework 380 is built in Java, provides spring boot based microservices for various functionalities related to integration flow design guideline validations service such as uploading integration artifact, saving user configurations, triggering integration flow analysis with user selected rules, downloading analysis reports, etc.

An ANTLR grammar generator and rule expression validator 370 may provide the rule grammar that is associated with rule expressions. The framework 370 may also evaluate the rule expressions as a part of rule compliance check analysis. In some embodiments, framework 370 provides a pluggable architecture for adding a new rule, defining rule grammar, providing rule implementations based on a standard rule interface and chain execution with other rules. ANTLR is a powerful parser generator for reading, processing, executing, or translating structured text or binary files. It can be used to build languages, tools, and frameworks.

For example, FIG. 4 illustrates ANTLR grammar 400 according to some embodiments along with a sample expression 410. From the grammar 400, ANTLR may generate a parser that can build and walk parse trees. ANTLR may provide recognition of a language of a grammar 400 via: a lexer, a parser, and the grammar. The lexer carries out a lexical analysis that identifies or skips groups of input characters. It provides input to the parser. The parser recognizes prescribed contextual orderings of tokens specified by a set of parsing rules. The parser expects lexer-emitted tokens to appear in a per-kind sequence defined by parser rules. A lexer grammar transforms character sequences into tokens, while a parser grammar transforms token sequences into an Abstract Syntax Tree ("AST"). The lexer and parser rules consist of rules that resemble assignment statements. The generated parser matches input tokens in turn to rules, emitting the AST (the parser's output product). For expression parsers, ANTLR4 provides optional callback visitor hooks during AST generation. Each callback would activate when its parent grammar node generates input to the AST. The grammar 400 is a set of lexer and parser rules that define grammar. ANTLR4 optionally enables combining the lexer and parser into one composite grammar file.

Figure 5:
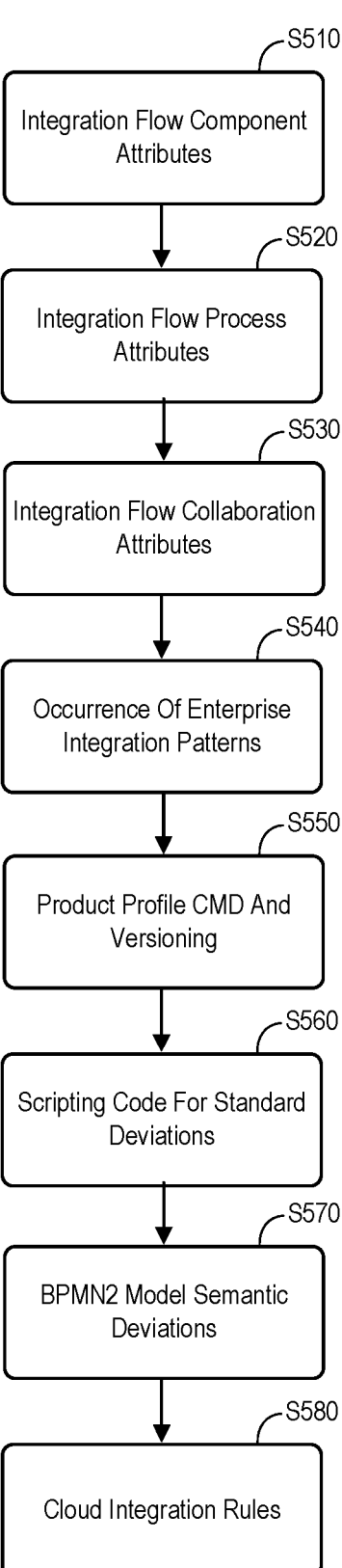
FIG. 5 is an analysis method in accordance with some embodiments.

FIG. 5 is an analysis method in accordance with some embodiments. At S510, the system may analyze integration flow component attributes. For example, the system may analyze the integration flow of a BPMN2 model for specific attributes related to integration flow steps. For all BPMN2 elements whose attributes or extensionElements has a property key called cmdVariantUri, if its value starts with ctype:: Flowstep Variant then it is treated as integration flow step. These integration flow steps may have many attributes, and these attributes constitute guidelines for many integration flow design guideline rules. For example, a: "Manage Large Batch Sizes" rule has attributes to be analyzed for an integration flow step to decide if the integration flow can handle large batch sizes in outbound requests.

At S520, the system may analyze integration flow process attributes. Integration flow process attributes are attributes (extensionElements) defined for the integration process in the BPMN2 model. These attributes may impact the guidelines for some of integration flow design guideline rules. For example, for a "Define Proper Transaction Handling" rule, this might be configured at integration process level. At S530, the system may analyze integration flow collaboration attributes. Integration flow collaboration attributes are attributes (extensionElements) defined for the entire collaboration space in the BPMN2 model. These attributes may impact the guidelines for some of integration flow design guideline rules. For example, for a "Specify Proper Session Handling" rule, this may be configured at collaboration level where multiple integration processes participate in the BPMN2 model.

At S540, the system may analyze occurrence of integration patterns. This analysis may check for the occurrence of specific integration patterns in the integration flow BPMN2 model. For example, as a part of an "Apply Message-Level Security" rule may indicate which verify sign and encrypt integration flow steps are implemented. At S550, the system may analyze product profile Component Meta-Data ("CMD") and software version incompatibilities. This analysis may check whether the latest version of the component was used in the integration flow development. This check may be required when the IFDG validator service is initialized with the latest version of the product CMD. If the component version that was used is old, the flow may lack enhancements that were later released for improvements of integration flow step.

At S560, the system may analyze scripting code for standard deviations and wrong usage of libraries and functions. This analysis may check if the scripts that were used in the integration flow develop follow some guidelines: were coding standard followed, are any third-party libraries used, usage of certain parsing techniques, security violations (e.g., the logging of sensitive data or accessing secure data), etc. At S570, the system may analyze BPMN2 model semantic deviations (such as identifying orphan nodes with a sequence flow). This analysis may check for defects during integration flow modeling using BPMN2 model using Integrated Development Environment ("IDE") tools. For example, one of the common mistakes is having an orphan integration flow step without being a participant in the integration process or collaboration. At S580, the system may analyze cloud integration rules. For example, open source CPILint rules automate the governance of integration flows by writing executable, rule-based development guidelines.

Figure 6:
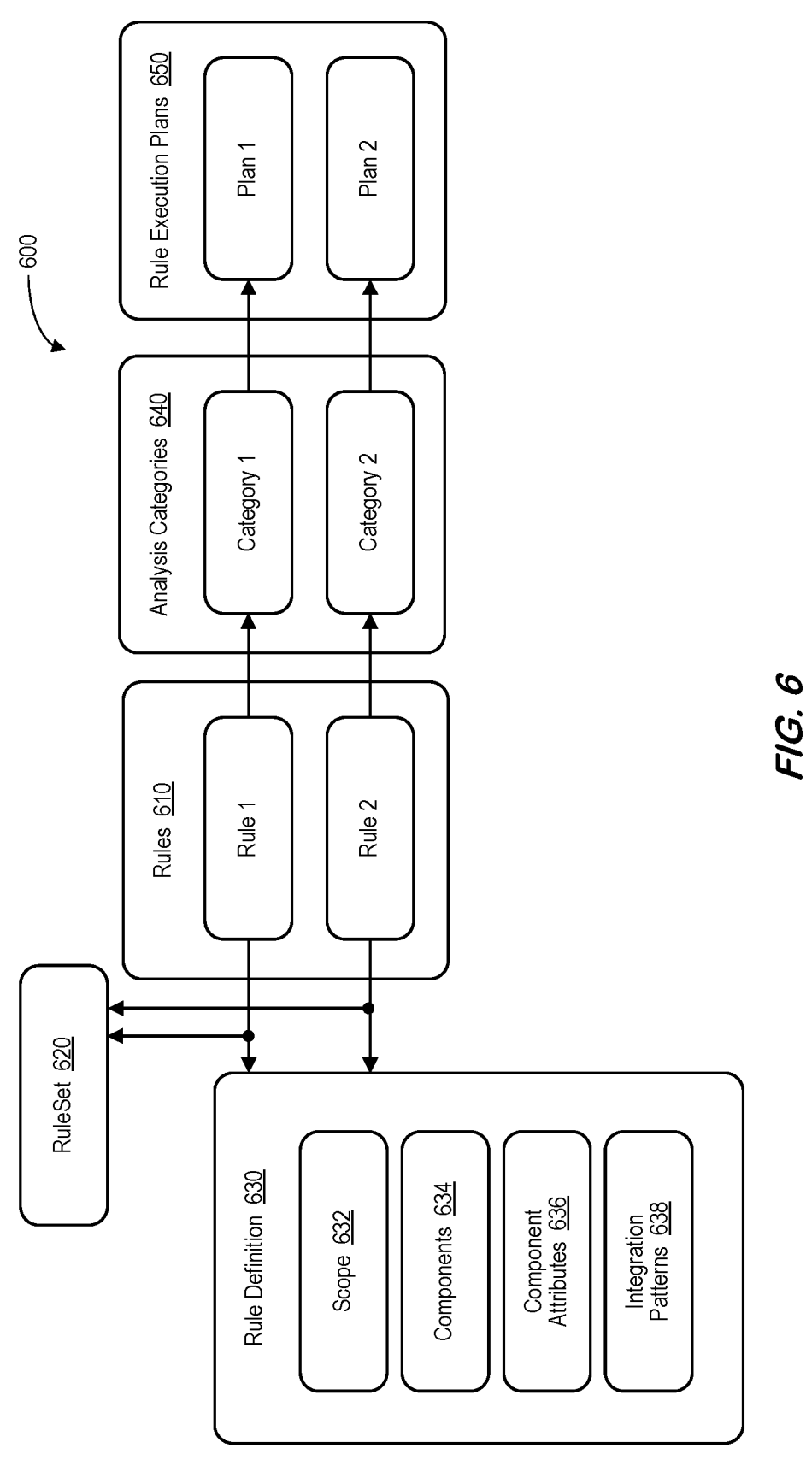
FIG. 6 is an integration flow design guidelines validator tool framework according to some embodiments.

FIG. 6 is an integration flow design guidelines validator tool framework 600 according to some embodiments. Here, rules 610 (e.g., rule 1 and rule 2) may be provided to a RuleSet 620. The RuleSet 620 provides a way to characterize the rules 610 by different qualities in a parent/child hierarchy (e.g., qualities associated with optimizing performance, optimizing memory footprint, security, transaction handling, script usage, etc.). These RuleSet 620 attributes may be derived from integration flow design guideline documentation.

The rules 610 provide an implementation for integration flow design guidelines rules as provided in help documentation for guidelines to design enterprise-grade integration flows. The rules 630 may be initialized via rule definition 630. The rule definition 630 provides scope 632 for rule analysis, details of component 634 and component attributes 636 (e.g., BPMN2 elements), integration patterns 638 to look for in the integration flow BPMN model, etc. In this way, the rule definition 630 may provide unique rule-specific configurations, which can help different components of IFDG validator service analyze the integration flow for design guideline rule compliance. According to some embodiments, each design guideline rule has its own rule definition 630 that provides data about what information should be analyzed in the BPMN2 model (e.g., where information may be related to BPMN2 elements and their attributes).

The framework also includes analysis categories 640 (e.g., category 1 and category 2) to help generate rule analysis result based on rule invocation and provide result back to the IFDG validator UI. Here, the rule invocation process may capture many details such as is the rule applicable, if applicable, did the rule compliance check pass, what elements are causing the compliance check failure, etc. The framework also includes rule execution plans 650 (e.g., plan 1 and plan 2) to implement logic to analyze an integration flow BPMN2 model depending on the different analysis categories 640 that the IFDG validator service framework supports. For example, a rule execution plan 650 may implement functionality to parse and analyze a BPMN2 model for rule definition entities as a part of a rule compliancy check analysis.

Figure 7:
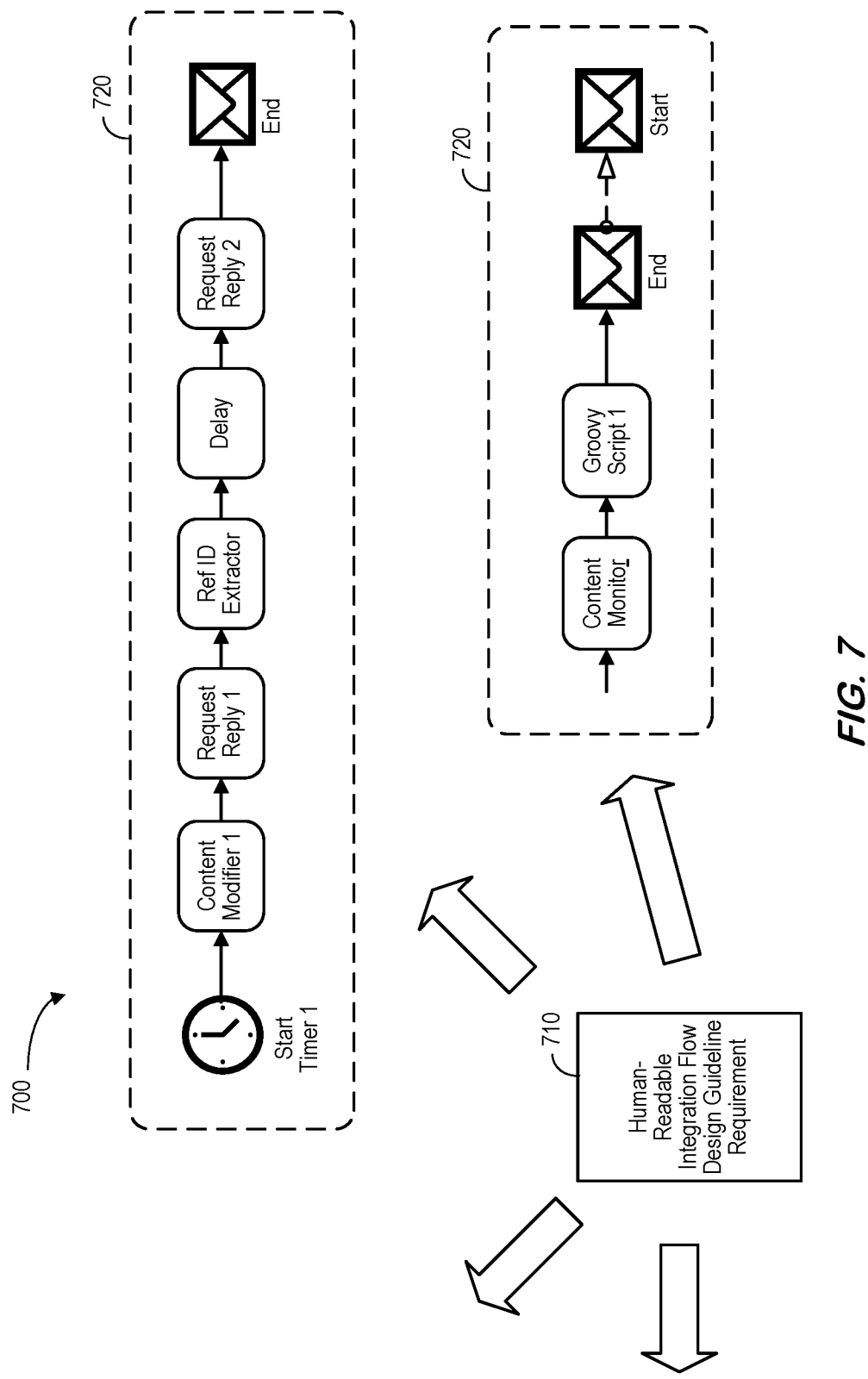
FIG. 7 illustrates guideline deviations in a BPMN2 modeler in accordance with some embodiments.

In some embodiments, an integration flow analysis can be enhanced to visually highlight the pipeline steps which are the source of problems based on design guidelines validator identified BPMN2 elements. This may help an integration flow developer quickly navigate to the BPMN2 that is associated with an enterprise integration pattern and needs some configuration changes. For example, FIG. 7 illustrates guideline deviations 700 in a BPMN2 modeler in accordance with some embodiments. Here, a human-readable integration flow design guideline requirement 710 is analyzed and used to highlight problematic integration flow segments 720 (e.g., in a BPMN viewer). Since we know all of the BPMN2 elements that were involved in the analysis (and have design guideline deviations for various rules), the system can color the corresponding BPMN shapes or diagrams to highlight them. This will help the user identify the integration flow steps and make corrections as per the recommendations.

Figure 8A:
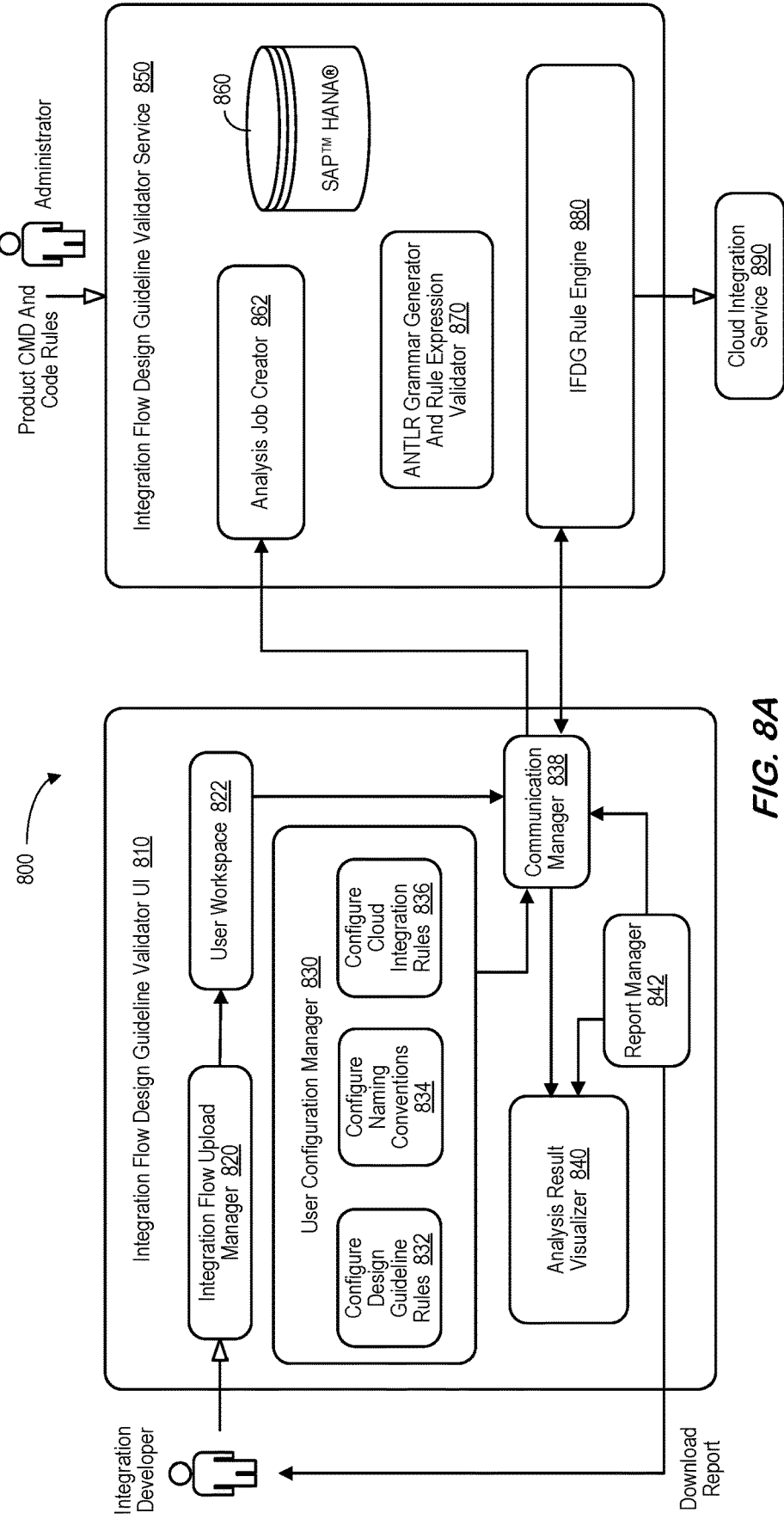
FIGS. 8A and 8B are a more detailed view of a business technology platform according to some embodiments.
Figure 8B:
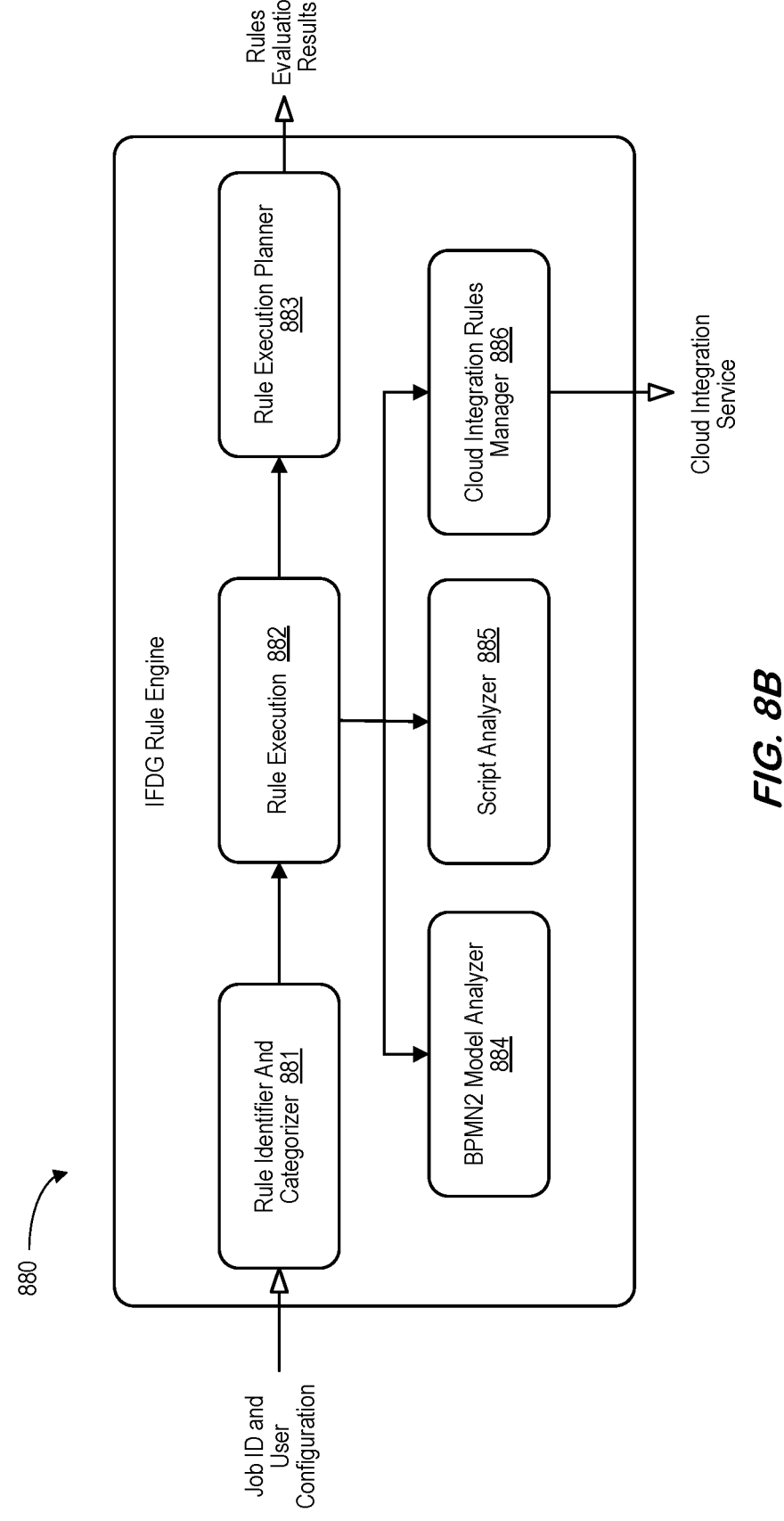

FIGS. 8A and 8B are a more detailed view of a business technology platform 800 according to some embodiments. An IFDG validator User Interface ("UI") 810 includes an integration flow upload manager 820 and a user workspace 822. The user workspace 822 may list all of the integration flows that were uploaded into the workspace, any of which can be selected for design guideline rule analysis. Also, uploads can be removed after analysis is completed. A user configuration manager 830 may include configure design guideline rules 832 to customize, sort, or group the integration flow design guidelines rules that a specific user wants to use and maintain for analysis purposes. The user configuration manager 830 may also include configure naming conventions 834 that check if naming conventions for different integration flow steps etc. are being followed. These may change from customer-to-customer and for different business scenarios of integration flows. As a result, a user may want to define custom regular expressions to validate the different integration flow step naming conventions. The end user may easily modify this JSON in the text editor and provide custom versions for different pipeline steps. The user configuration manager 830 may further include configure cloud integration rules 836. For example, CPILint is a third-party rule validation framework that helps users add custom rules for some development specific validations via a command-line tool that automates governance of integration flows.

A communication manager 838 may be responsible for communicating with the IFDG validator service 850 and handle the requests/responses, using responses to build a data model (which can be consumed by different components such as the user workspace 822 or analysis result visualizer 840). The communication manager 838 may also handle report download requests from the end user via the report manager 842 and presentation of results via a report manager 842.

The IFDG validator service 850 includes SAP™ HANA® 860, an Analysis job creator 862, an ANTLR grammar generator and rule expression validator 870, and an IFDG rule engine 880 similar to the corresponding components described in connection with FIG. 3. The IFDG rule engine 880 may interact with a cloud integration service 890 to provide integration with CPILint (an open-source framework to automate governance of integration flows using writing executable, rule-based development guidelines).

FIG. 8B is a more detailed view of the IFDG rule engine 880 including a rule identifier and categorizer 881 that receives a job identifier and user configuration information (e.g., a list of rules that a user wants to run, a naming convention JSON, etc.) along with user context information (e.g., a user identifier, a user email address, and a user name). The rule identifier and categorizer 881 can then fetch the integration flow BPMN2 model and script data from the SAP™ HANA® 860. The rule identifier and categorizer 881 also identifies the set of rules to run from the request input and categorizes them based on analysis categories.

The IFDG rule engine 880 also includes rule execution 882 that interacts with a BPMN2 model analyzer 884, a script analyzer 885, and a cloud integration rules manager 886. Based on data from previous module input, the rule execution 882 may initialize a rule definition configuration specific to rule (e.g., containing details related to scope) and determine the component, attributes, and integration patterns that need to be analyzed. The rule execution 882 may then initialize the rule invocation class with specific input arguments (depending on rule analysis category) assign a rule execution plan to identify integration flow steps that need to be analyzed for deviation from the integration flow design guidelines. During rule invocation, these execution plans get executed and BPMN2 elements may be identified for further analysis either at a process or attributes level. The rule execution 882 then runs the rule, validates the rule execution 882 response, and builds a rule analysis response object. In some embodiments, the rule response is enriched with additional metadata (e.g., severity, rule name, rule analysis results, etc.).

The IFDG rule engine 880 further includes a rule execution planner 883 that chains the rule execution 882 methods for all the rules that the user requested to run and aggregates the result of each rule execution 882. The rule execution planner 883 may also save the aggregated rule execution response to the SAP™ HANA® 860 with user context and return final aggregated rule execution response to IFDG validator UI 810

Figure 9A:
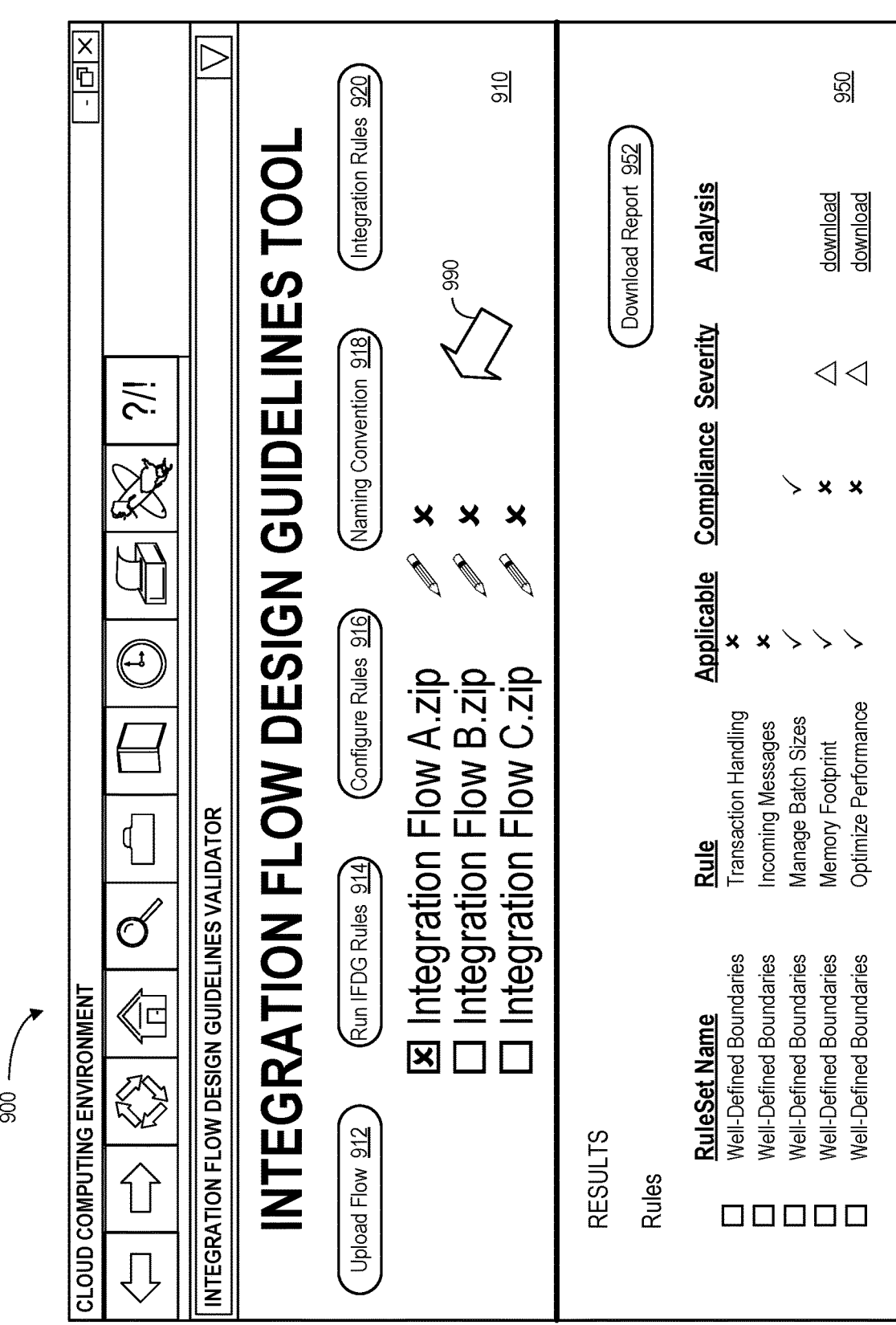
FIGS. 9A and 9B are integration flow design guidelines tool displays in accordance with some embodiments.

FIG. 9A is an integration flow design guidelines tool display 900 in accordance with some embodiments. The display 900 includes a list 910 of integration flow files that can be selected for upload and validation. The user selects files in the list 910, selects an "Upload Flow" icon 912 (e.g., via touchscreen or computer mouse pointer 990) to begin the process. The user can then select a "Run IFDG Rules" icon 914 to analyze the uploaded integration flows with respect to all integration flow design guideline rules in a few seconds. The user may also select a "Configure Rules" icon 916, a "Naming Convention" icon 918, and/or an "Integration Rules" icon 920 to customize the system.

The display 900 further includes a list of results 950. The results 950 include RuleSet names associated with a grouping of integration flow design guidelines rules based on different categories as described in public documentation. The results 950 further include a rule name associated with a grouping of integration flow design guidelines rules based on different RuleSets. The results 950 also include an indication of whether each rule as applicable (as decided by a IFDG validator service based on usage of specific enterprise integration patterns or pipeline steps in the integration flow) and an indication of rule compliance attribute (decided by the IFDG validator service based on BPMN2 model analysis for that specific integration flow). In some embodiments, the results 950 also include a severity indicating a priority to fix the problem in the integration flow implementation (e.g., based on performance, transaction handling, scripting, etc.). The results 950 may further include an analysis link that will provide insight into the issues which are being identified in the integration flow during the compliance check scan and provide a recommendation how it can be resolved. The user can also select a "Download Report" icon 952 to receive a PDF or Excel® file summarizing the validation results.

Figure 9B:
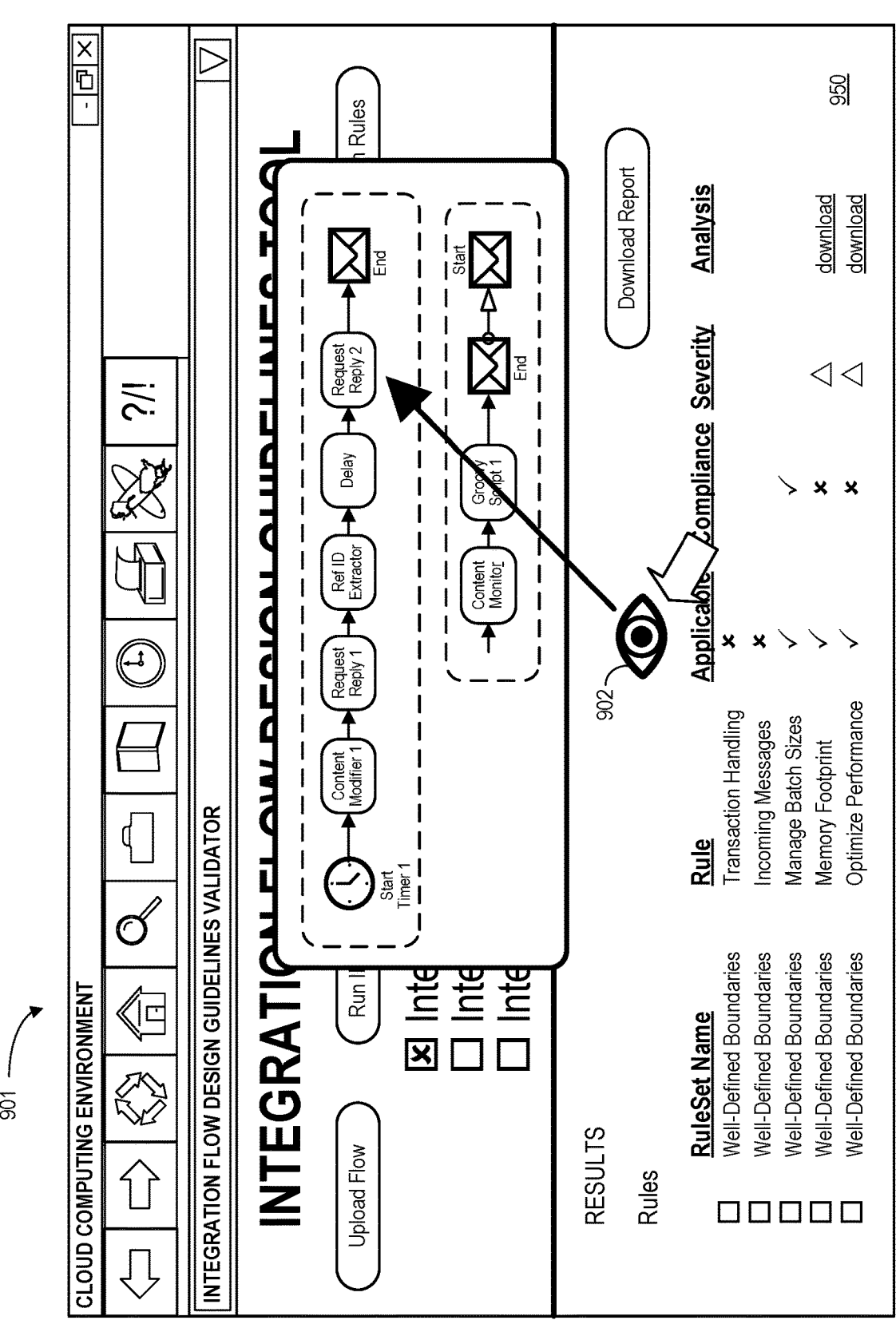

FIG. 9B is another integration flow design guidelines tool display 901 in accordance with some embodiments. In this case, the display 901 includes a guideline deviation highlight icon 902 in the list of results 950. Selection of the icon 902 may result in the system visually highlighting guideline deviations in the BPMN viewer for the analyzed integration flow. Since the system is aware of the BPMN2 elements involved in the analysis (and have design guideline deviations for various rules), it can color or otherwise draw attention to the corresponding BPMN shapes or diagrams. This may help a user identify the applicable integration flow steps and implement corrections as per the recommendations. Such an embodiment may let the user easily locate the relevant integration flow steps even in a complex integration flow with hundreds of steps or BPMN2 elements.

Thus, embodiments may provide an automation solution that checks and validates adherence to many integration flow design guidelines for a provided integration flow (and identify integration flow steps that need to be fixed). Embodiments may also not only identify deviations but also provide recommendations about how to fix the problems and where to fix it (which pipeline steps) in the integration flow BPMN2 model.

Figure 10:
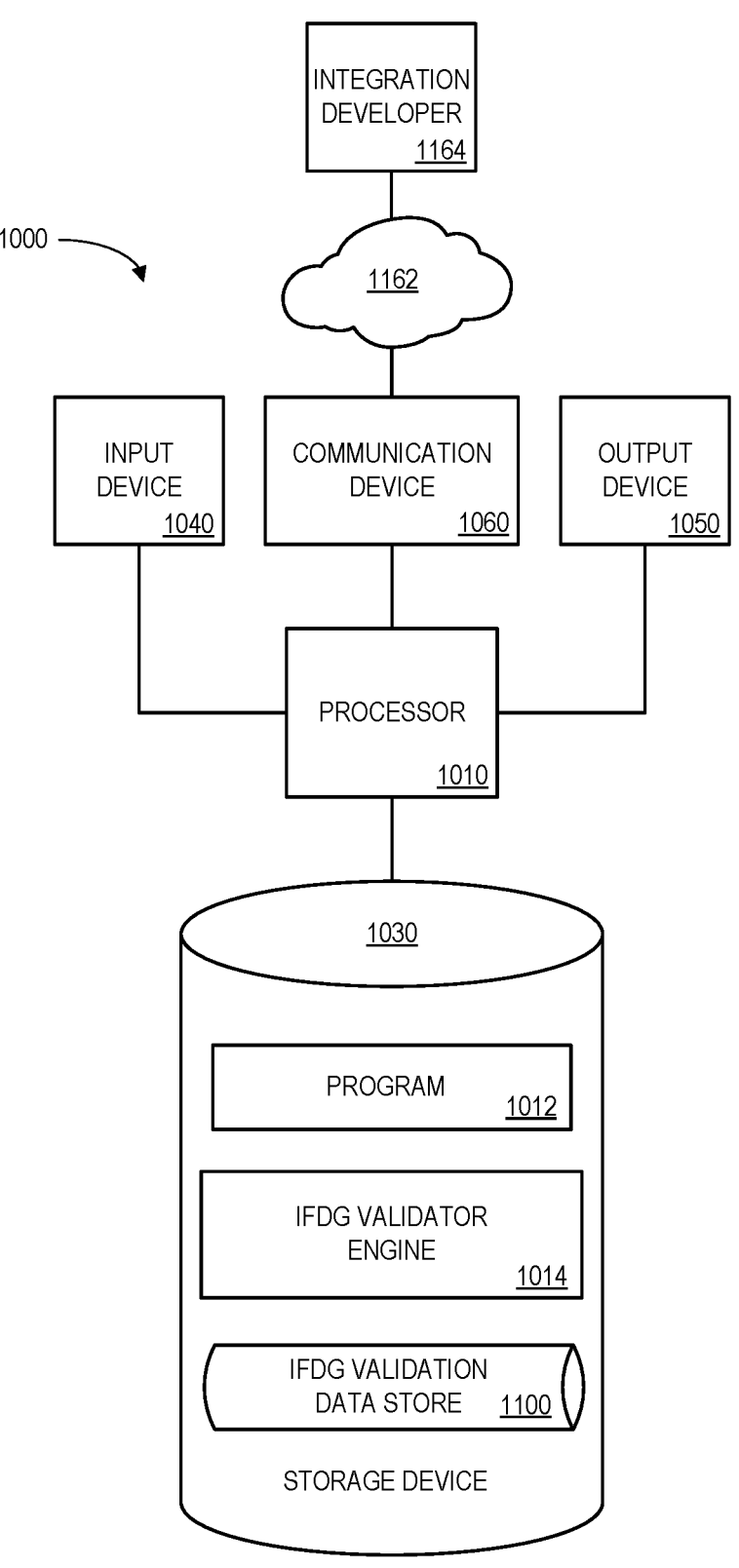
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the systems 100, 300 of FIGS. 1 and 3, respectively (and/or any other system described herein). The platform 1000 comprises a processor 1010, such as one or more commercially available Central Processing Units ("CPUs") in the form of one-chip microprocessors, coupled to a communication device 1060 configured to communicate via a communication network (not shown in FIG. 10). The communication device 1060 may be used to communicate, for example, with one or more remote user platforms, administrator platforms, etc. The platform 1000 further includes an input device 1040 (e.g., a computer mouse and/or keyboard to input microservice or integration flow information) and/an output device 1050 (e.g., a computer monitor to render a display, transmit recommendations and alerts, and/or create reports about integration services, validation results, tenants, users, etc.). According to some embodiments, an integration developer 1164 mobile device and/or PC may be used to exchange information with the platform 1000 via a distributed communication network 1162.

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or IFDG validator engine 1014 for controlling the processor 1010. The processor 1010 performs instructions of the programs 1012, 1014, and thereby operates in accordance with any of the embodiments described herein. For example, the processor 1010 may receive, from an integration developer, an integration flow model for the integration service defined in a standardized graphical notation protocol. The processor 1010 may then determine which integration flow design guideline requirements are applicable to the received integration flow model. The processor 1010 automatically generates compliance results based on whether the received integration flow model complies with each applicable integration flow design guideline requirement using rule concept semantics. In addition, the processor 1010 may perform a non-compliance analysis, determine a non-compliance severity indication, generate at least one compliance recommendation, and/or provide an output to the integration developer.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores an IFDG validation data store 1100. An example of a database that may be used in connection with the platform 1000 will now be described in detail with respect to FIG. 11. Note that the database described herein is only one example, and additional and/or different information may be stored therein. Moreover, various databases might be split or combined in accordance with any of the embodiments described herein.

Referring to FIG. 11, a table is shown that represents the IFDG validation data store 1100 that may be stored at the platform 1000 according to some embodiments. The table may include, for example, entries identifying flow steps that have been created and/or customized for integration services associated with a cloud computing environment. The table may also define fields 1102, 1104, 1106, 1108, 1110 for each of the entries. The fields 1102, 1104, 1106, 1108, 1110 may, according to some embodiments, specify: a rule identifier 1102, a rule description 1104, an integration flow 1106, an applicability indication 1108, and a compliance indication 1110. The IFDG validation data store 1100 may be created and updated, for example, when new rules are added to a system, new integration flows are validated, etc.

The rule identifier 1102 might be a unique alphanumeric label that is associated with a particular application flow design guideline rule or requirement. The rule description 1104 may describe the subject or purpose of the rule, and the integration flow 1106 may comprise an identifier that specifies an integration flow (e.g., newly developed or experiencing a problem). The applicability indication 1108 reflects whether that particular rule is relevant to that particular integration flow. If relevant, the compliance indication 1110 reflects whether the integration flow satisfies the rule (and, if not satisfied, where and how corrections may be implemented).

In this way, embodiments may improve the quality of integration flow creation (making it enterprise-grade) which safeguards enterprise mission-critical business processes. The tool may also reduce support incidents associated with the integration flow (helping L1/L2 and product support teams). Embodiments may let an integration developer quickly identify deviations from integration flow design guidelines for a developed integration flow, saving days of effort as compared to doing the analysis manually. Moreover, embodiments may support integration consultant teams by helping them ensure compliance with appropriate integration guidelines. In some embodiments, a IFDG service provides spring boot based Representational State Transfer ("REST") services for integration flow design guidelines validations. Continuous Integration/Continuous Deployment ("CI/CD") DevOps pipelines can be built using a continuous delivery system (such as the SAP™ Piper® framework) which provides automated quality checks (e.g., for design guidelines, coding standards, etc.) before integration flow artifacts are transported from development to production systems and before a customer goes to production live with integration scenarios.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
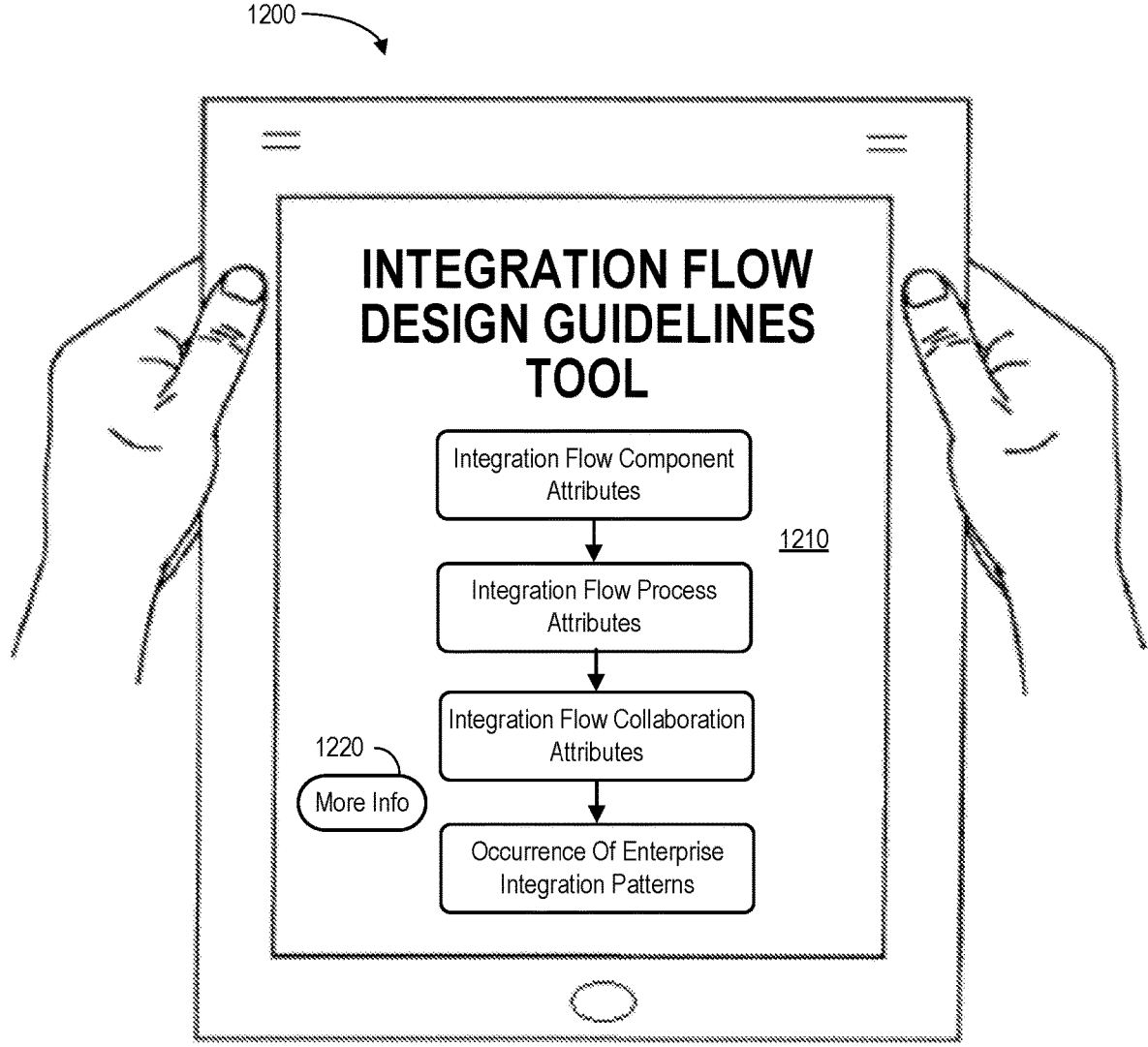
FIG. 12 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of integration services and microservices, any of the embodiments described herein could be applied to other types of applications. Moreover, the displays shown herein are provided only as examples, and any other type of user interface could be implemented. For example, FIG. 12 illustrates a tablet computer 1200 providing integration analysis steps for an IFDG tool 1210. The tool 1210 might be used, for example, to modify aspects of the analysis via selection of a "More Info" icon 1220.

Figure 13:
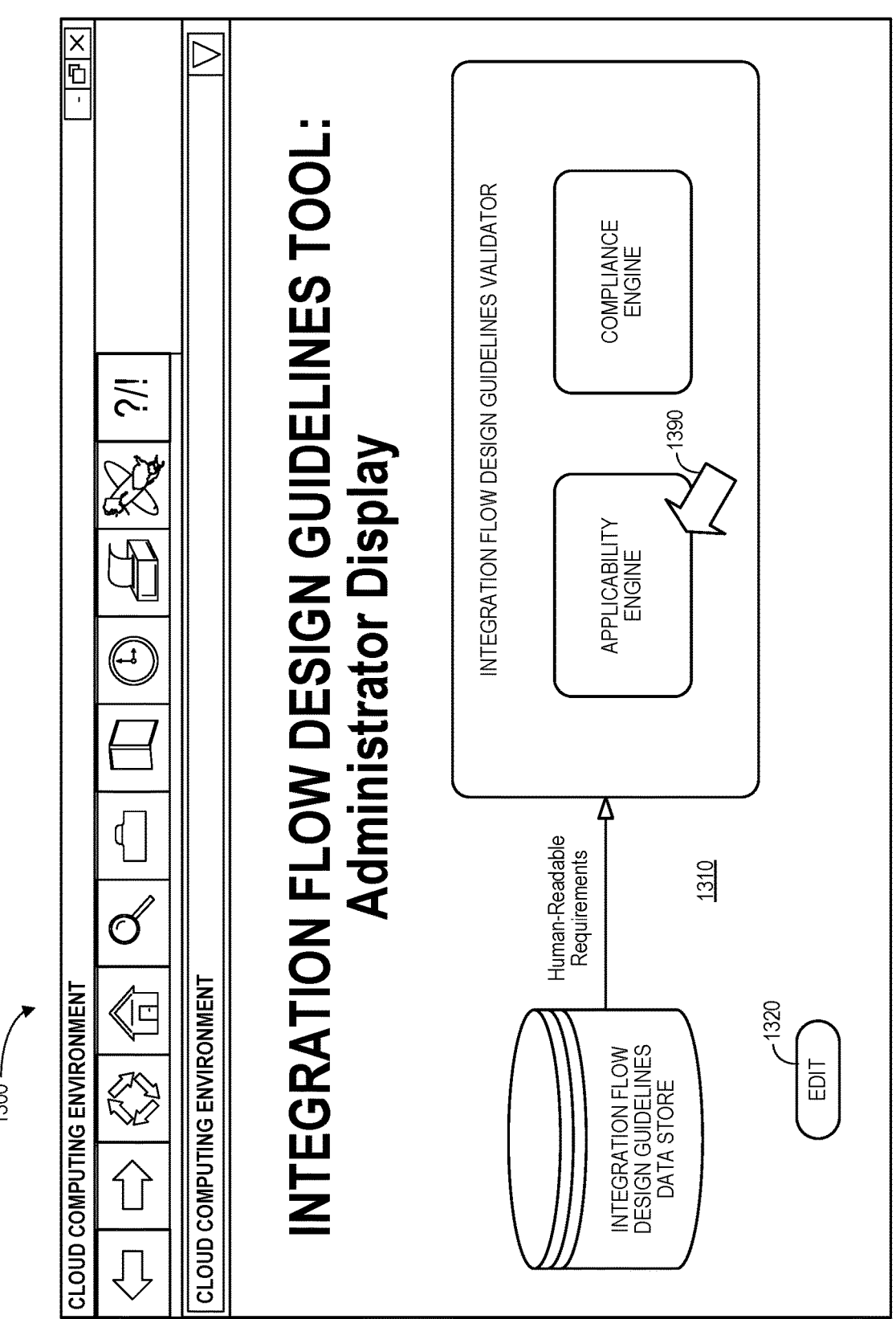
FIG. 13 is an operator or administrator display in accordance with some embodiments.

FIG. 13 is an operator or administrator display in accordance with some embodiments. The display 1300 includes a graphical representation 1310 of an integration flow design guidelines validator system in accordance with any of the embodiments described herein. Selection of an element on the display 1300 (e.g., via a touchscreen or computer pointer 1390) may result in display of a pop-up window containing more detailed information about that element and/or various options (e.g., select IFDG categories, link new data stores, etc.). Selection of an "Edit" icon 1320 may also let an operator or administrator adjust the operation of the system (e.g., to change a validation rule, add a new type of integration flow, customize enterprise-wide preferences, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with an enterprise cloud computing environment having an integration service, comprising:
    an integration flow design guidelines data store that contains a plurality of electronic records, each record comprising an integration flow design guideline identifier and human-readable integration flow design guideline requirements; and
    an integration flow design guideline validator, coupled to the integration flow design guideline data store, including:
        a computer processor, and a computer memory storing instructions that when executed by the computer processor cause the integration flow design guideline validator to:
            receive, in response to a user selection via a graphical user interface, an integration flow model for the integration service defined in a standardized graphical notation protocol;
            determine which integration flow design guideline requirements are applicable to the received integration flow model;
            automatically generate compliance results based on whether the received integration flow model complies with each applicable integration flow design guideline requirement using rule concept semantics for one or more rules;
            output, automatically to a display of a user computing device, a presentation including a guideline deviation user interface element and an indication of the compliance results, the compliance results including an indication of whether each of the one or more rules is determined applicable and compliant with the received integration flow model and a link to a file summarizing validations results; and
            generate to the display, in reply to an interaction with the guideline deviation user interface element, a presentation of a representation of the received integration flow model including model elements highlighted to indicate deviations based on the generated compliance results and including, in response to the generated compliance results, at least one compliance recommendation change to make to the received integration model to achieve compliance with the determined applicable integration flow design guideline requirements.

2. The system of claim 1, wherein the integration flow design guideline validator is further configured to, for each applicable integration flow design guideline requirement that is not complied with by the received integration flow model, automatically provide a non-compliance analysis to the integration developer.

3. The system of claim 2, wherein the non-compliance analysis includes a non-compliance severity indication.

4. The system of claim 2, wherein the non-compliance analysis includes an analysis of at least one of: (i) integration flow component attributes, (ii) integration flow process attributes, (iii) integration flow collaboration attributes, (iv) enterprise integration pattern occurrence, (v) component metadata and component versioning, (vi) scripting code libraries and functions, (vii) semantic deviations from the standardized graphical notation protocol, and (viii) open source framework guidelines.

5. The system of claim 1, wherein the determination of which integration flow design guideline requirements are applicable to the received integration flow model is automatically performed using rule concept semantics.

6. The system of claim 1, wherein the received integration flow model is associated with enterprise integration patterns.

7. The system of claim 1, wherein at least one human-readable integration flow design guideline requirement is associated with at least one of: (i) security, (ii) readability, (iii) error handling, (iv) scripting, (v) managing boundary conditions, (vi) memory optimization, and (vii) performance optimization.

8. The system of claim 1, wherein the integration flow design guideline validator comprises Software-as-a-Service ("SaaS").

9. The system of claim 8, wherein the integration flow design guideline validator utilizes a computer-based language recognition parser generator.

10. A computer-implemented method associated with an enterprise cloud computing environment having an integration service, comprising:

receiving, by a computer processor of an integration flow design guideline validator in response to a user selection via a graphical user interface, an integration flow model for the integration service defined in a standardized graphical notation protocol;

determining, based on information in an integration flow design guidelines data store that contains a plurality of electronic records, each record comprising an integration flow design guideline identifier and human-readable integration flow design guideline requirements, which integration flow design guideline requirements are applicable to the received integration flow model;

automatically generating compliance results based on whether the received integration flow model complies with each applicable integration flow design guideline requirement using rule concept semantics for one or more rules; and outputting, automatically to a display of a user computing device, a presentation including a guideline deviation user interface element and an indication of the compliance results, the compliance results including an indication of whether each of the one or more rules is determined applicable and compliant with the received integration flow model and a link to a file summarizing validations results; and generating to the display, in reply to an interaction with the guideline deviation user interface element, a presentation of a representation of the received integration flow model including model elements highlighted to indicate deviations based on the generated compliance results and including, in response to the generated compliance results, at least one compliance recommendation change to make to the received integration model to achieve compliance with the determined applicable integration flow design guideline requirements.

11. The method of claim 10, wherein the integration flow design guideline validator is further configured to, for each applicable integration flow design guideline requirement that is not complied with by the received integration flow model, automatically provide a non-compliance analysis to the integration developer.

12. The method of claim 11, wherein the non-compliance analysis includes a non-compliance severity indication.

13. The method of claim 11, wherein the non-compliance analysis includes an analysis of at least one of: (i) integration flow component attributes, (ii) integration flow process attributes, (iii) integration flow collaboration attributes, (iv) enterprise integration pattern occurrence, (v) component metadata and component versioning, (vi) scripting code libraries and functions, (vii) semantic deviations from the standardized graphical notation protocol, and (viii) open source framework guidelines.

14. The method of claim 10, wherein the determination of which integration flow design guideline requirements are applicable to the received integration flow model is automatically performed using rule concept semantics.

15. A non-transitory, machine-readable medium comprising instructions thereon that, when executed by a processor, cause the processor to execute operations to perform a method associated with an enterprise cloud computing environment having an integration service, the method comprising:

receiving, by a computer processor of an integration flow design guideline validator in response to a user selection via a graphical user interface, an integration flow model for the integration service defined in a standardized graphical notation protocol;

determining, based on information in an integration flow design guidelines data store that contains a plurality of electronic records, each record comprising an integration flow design guideline identifier and human-readable integration flow design guideline requirements, which integration flow design guideline requirements are applicable to the received integration flow model;

automatically generating compliance results based on whether the received integration flow model complies with each applicable integration flow design guideline requirement using rule concept semantics for one or more rules; and outputting, automatically to a display of a user computing device, a presentation including a guideline deviation user interface element and an indication of the compliance results to the integration developer, the compliance results including an indication of whether each of the one or more rules is determined applicable and compliant with the received integration flow model and a link to a file summarizing validations results; and generate to the display, in reply to an interaction with the guideline deviation user interface element, a presentation of a representation of the received integration flow model including model elements highlighted to indicate deviations based on the generated compliance results and including, in response to the generated compliance results, at least one compliance recommendation change to make to the received integration model to achieve compliance with the determined applicable integration flow design guideline requirements.

16. The medium of claim 15, wherein the received integration flow model is associated with enterprise integration patterns.

17. The medium of claim 15, wherein at least one human-readable integration flow design guideline requirement is associated with at least one of: (i) security, (ii) readability, (iii) error handling, (iv) scripting, (v) managing boundary conditions, (vi) memory optimization, and (vii) performance optimization.

18. The medium of claim 15, wherein the integration flow design guideline validator comprises Software-as-a-Service ("SaaS").

19. The medium of claim 18, wherein the integration flow design guideline validator utilizes a computer-based language recognition parser generator.

* * * * *